April 14, 1970  M. DEFAUW  3,506,286
PLASTIC COLLAR FOR THE ORIFICE OF A VESSEL
Original Filed Sept. 25, 1964  2 Sheets-Sheet 1
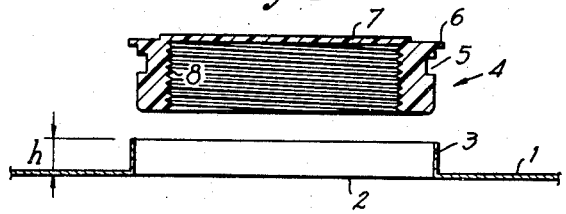
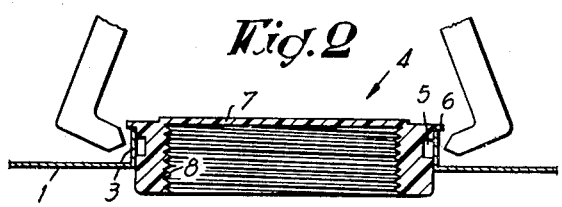
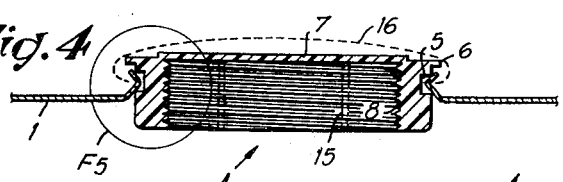
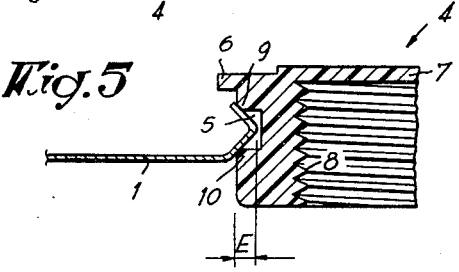
INVENTOR
M. Defauw
BY Richards Geier
ATTORNEYS April 14, 1970     M. DEFAUW     3,506,286
PLASTIC COLLAR FOR THE ORIFICE OF A VESSEL
Original Filed Sept. 25, 1964     2 Sheets-Sheet 2
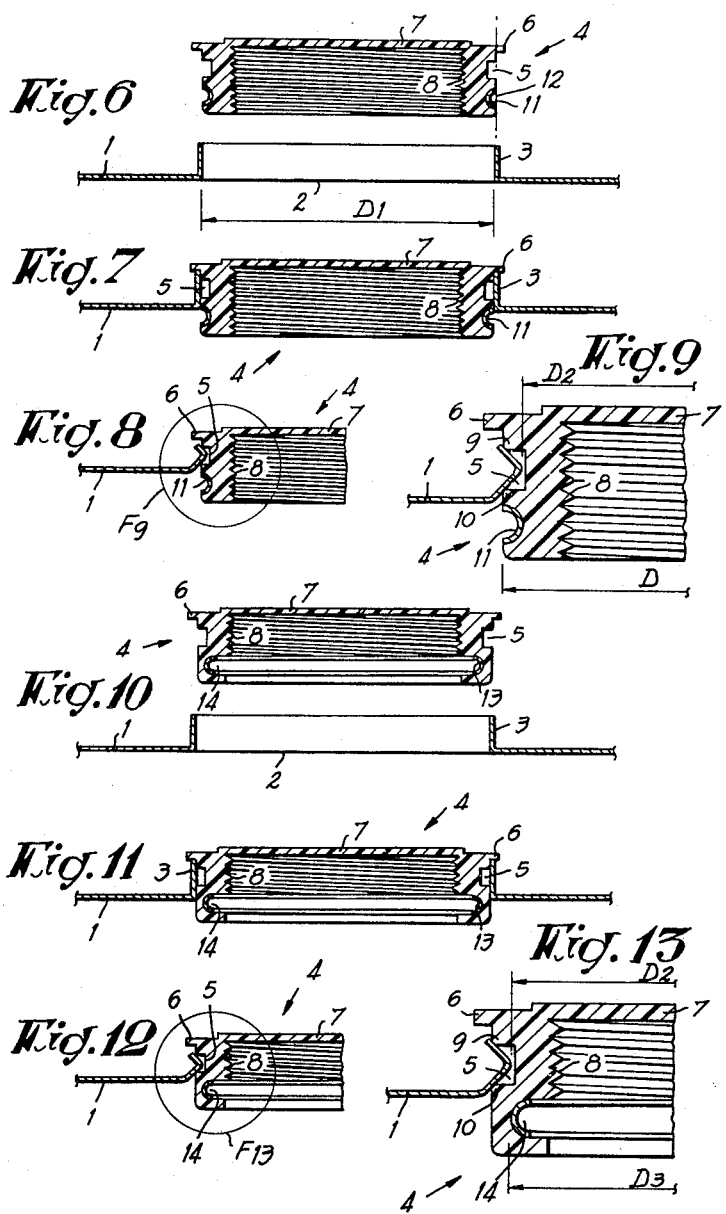
INVENTOR
M. Defauw
BY
Richards & Geier
ATTORNEYS

United States Patent Office 3,506,286
Patented Apr. 14, 1970

3,506,286
PLASTIC COLLAR FOR THE ORIFICE OF A VESSEL
Marcel Defauw, Ghent, Belgium, assignor to Rheem Manufacturing Company, San Francisco, Calif.
Original application Sept. 25, 1964, Ser. No. 399,220. Divided and this application Sept. 11, 1967, Ser. No. 675,731
Claims priority, application Belgium, Sept. 30, 1963, Patent 637,970
Int. Cl. F16l 5/00, 41/00
U.S. Cl. 285—203         2 Claims

ABSTRACT OF THE DISCLOSURE

A relatively elastic plastic collar for insertion into the orifice of a vessel is formed with peripheral exterior grooves. Material of the vessel is deformed into one of the grooves and an annular reinforcing member into the other groove. A diaphragm integral with the collar is formed across the outer face thereof.

---

This application is a division of S.N. 399,220, filed Sept. 25, 1964, now Patent No. 3,338,357.

This invention relates to vessels of all kinds, but particularly to metal casks or barrels; main object is concerned with a novel procedure for fixing a plastic collar or grummet in the orifice used for filling and emptying the vessel.

This collar will be adaptable indiscriminately to a bung, a plug, a discharge pipe connection, or connections of pumps, filling devices, etc. It can also cooperate with, or integrally comprise a membrane inseparably secured so as to withstand any removal effort short of destruction, with a view to constituting with said collar a so-called inviolable closure of said vessel.

The invention essentially aims at providing a method such that not only the fixing of said plastic collar on said vessel can be effected easily with the speed as required in industrial mass production methods, but also that in all cases an invulnerable fastening will result, even if a relatively flexible plastic material is used for the collar.

In order to achieve these aims the method of the invention comprises, starting on the one hand from a vessel of which the orifice requiring a collar durably to be secured therein is provided with a neck, the height of which is to be determined in accordance with the shape of the collar, as will be explained in detail hereinafter, and on the other hand from a collar of plastic material, preferably having very little elasticity, said collar comprising a ring-shaped body having at least one annular groove or channel of substantial depth formed in the cylindrical outer face thereof, the steps of inserting and fitting said collar in said orifice of the vessel so as to fully enclose said groove or channel within said neck, and deforming said neck so as to cause the latter to penetrate into said peripheral groove or channel of said collar, in such a way that the latter cannot be disengaged from said neck without destruction or damage beyond repair.

If for the collar a plastic material having very small elasticity, e.g. low pressure polyethylene, is used, the inviolability of the collar fastening will be ensured by the engagement of said neck, through deformation thereof, with said peripheral groove of the collar, this deformation and this engagement being such as to systematically prevent the separation of the parts so engaged by any means short of destruction. If for some reason use is made of a plastic material of such elasticity as to justify the fear that the collar might be liable, through elastic deformation, to be forcibly disengaged from the orifice the method according to the invention may be completed in that one will start from a collar which has previously been reinforced by means of at least one stop ring inseparably secured thereto, said stop ring having an outer diameter which is only slightly smaller than the initial inner diameter of the neck of the vessel orifice, but larger than the inner diameter after deformation of said neck.

Single or multiple reinforcements of this kind may be provided on the outside or the inside of the ringshaped body of the collar.

Apart from the method as defined above, the invention also concerns any collar or grummet specially conditioned for the application in any form of said method. Such a collar or grummet may or may not comprise a safety closing membrane, inner threading, a peripheral upper rim to be used as a stop for limiting the depth of insertion of the collar into the vessel neck and for correctly positioning the peripheral groove of the collar with respect to said neck; morever said collar can receive a plug, bung, cock or similar device. It may have any shape compatible with the application of the above said method, and any dimensions compatible with the size of the vessel and its contents, and it may be made of any suitable plastic.

However, after further investigation it has been found that the adherence as well as said tightness can be largely improved by the use of exceedingly simple means, so as to considerably widen the field of application of metal vessels and similar packing using this method of securing a plastic collar on a barrel made of metal.

In fact, said collars made of plastic material, by virtue of their relatively very low price, are economically extremely attractive. However in order to be able to fulfill their various functions as a temporary seal and as a possible receiving device suitable for connection of external devices, such as pipes, pump conduits, cocks, discharge tubes and the like, said collars must necessarily have adequate mechanical strength and relatively low elasticity.

It has been found that the adherence as well as the tightness at the contact surfaces between the collar and the metal parts could be considerably increased if at those contact places said collar would exhibit more elasticity, but without impairing the mechanical strength of the collar.

Accordingly the improvements according to the invention consist in the step, prior to the fastening of the collar by circumferential indentation of the neck of the metal barrel, of inserting a ring into said peripheral channel of said collar, said ring being made of a material having greater elasticity than the material the collar is made of.

This insertion ring of relatively high elasticity may be made of any suitable natural or synthetic material.

By virtue of this additional step, the result is obtained that when the circumferential indentation is produced in the neck surrounding the bung hole of the barrel, the indented portions of the metal will penetrate deeply into the peripheral chanel provided in said collar whilst exerting considerable pressure on said insertion ring so as to compress said elastic ring within the space delineated on the one hand by the walls of said peripheral channel provided in said collar, and on the other hand by the adjacent portion of the indented neck, thus to cause said elastic ring to exert considerable pressure on all the surrounding surfaces.

Though the flanks of the indented portion of the neck rest on the outer edges of the channel provided in said collar, the latter being made of a material having little elasticity, the surface of contact between the metal and the insertion ring of elastic material will be relatively large so as to produce very considerable adhesive forces between the elastic material and the metal. Similarly, as the contact surface between said elastic insertion ring and the walls delineating the channel provided in said collar is also quite extensive, the adherence between said ring and said collar will also be relatively strong.

In a practical embodiment, which is by no means limitative, the collar may e.g. be made of polypropylene, whereas the insertion ring is made of natural or synthetic rubber. Said insertion ring will have a cross-section approximately equal to that of the peripheral channel provided in said collar so that, prior to the fastening of the collar by the formation of a circumferential indentation in the neck surrounding the bung hole of the metal barrel, said insertion ring will substantially fill up said peripheral channel.

In this way, when the circumferential indentation is formed in said neck of said metal vessel, maximum pressure is made to bear on all surfaces of the enclosure achieved by the flanks of the indented portion of the neck coming to rest against the outer edges of the channel provided in said collar.

This continuity of said contact surfaces of said elastic insertion ring will also ensure maximum efficiency and reliability of the seal between the barrel and the collar.

The invention concerns the fixing method in itself as well as the collar made of plastic material and provided with an insertion ring of the kind described made of natural or synthetic elastic material, specially with a view to its use in applying said fixing method.

For better understanding a few examples will be described hereinafter with reference to the accompanying drawings, in which:

FIGURES 1, 2, 3 and 4 schematically represent the four successive characteristic main steps of the method according to the invention;

FIGURE 5 represents, on an enlarged scale, the portion indicated by F5 in FIGURE 4;

FIGURES 6, 7 and 8 represent three successive steps of the method using collars having some elasticity;

FIGURE 9 shows on an enlarged scale, the portion indicated by F9 in FIGURE 8;

FIGURES 10, 11 and 12 illustrate three successive steps of the method as applied to a collar having some elasticity;

FIGURE 13 shows on an enlarged scale, the portion indicated by F13 in FIGURE 12.

In applying the method according to the invention for securing collars made of plastic of a relatively hard quality, one starts from a vessel 1, of which the orifice 2 to be provided with a collar is delimited by a protruding neck 3. In the example shown, the collar 4 consists of a ring-shaped body having a peripheral groove or channel 5, a peripheral stop rim or flange 6, a safety membrane 7 and an inner threading 8. The first step of the method, as schematically shown in FIGURE 2, consists in inserting the collar 4 into the orifice 2 until the peripheral stop flange 6 rests on the upper edge of the neck 3. Generally the use of force is required for this insertion, though this is by no means an essential condition. It is to be noted that the height $h$ of the neck 3 as well as the dimensions and the position of the peripheral channel 5 must be determined in such a way, that after complete insertion of the collar 4, as illustrated in FIGURE 2, said neck 3 should not only entirely cover up said peripheral channel 5, but should also extend on either side thereof. The next step, as shown in FIGURE 3, consists in submitting said neck 3 to a deformation treatment around the whole periphery thereof, in such a way, that after such treatment said neck exhibits an indented cross-section, i.e. a part toroidal surface which forcefully engages with said peripheral channel 5 whilst exerting pressure against the upper and lower edges, 9 and 10 respectively, of said channel, the later condition being indispensible in order to secure the wanted result.

In this way, not only inviolable fastening of the collar 4 on the vessel 1 is ensured, but also, owing to the duplicate seal as automatically realized through application of the method, this fastening ensures an absolutely tight junction between the vessel and the circumferential surface of the collar.

After having been submitted to such deformation the neck 3 possesses considerable strength and it is practically impossible to restore it into its original state without damaging the collar. As the latter is of great hardness itself, it is immune from elastic deformation and cannot be destroyed without causing considerable damage.

In order to achieve this result it suffices that the thickness E of the plastic material of the collar 4, taken between the inner diameter of the distorted neck 3 and the outer diameter of the ringshaped shoulder of said collar is sufficient to prevent elastic deformation being caused by traction on said collar beyond said inner diameter of the distorted collar.

FIGURES 6 to 9 relate to the same method being applied in using a collar 4, made of plastic material having greater elasticity than in the case previously described. The same steps are taken as in the case just described, but the collar 4, prior to the treatment, has been reinforced by external ring 11 engaging a peripheral groove 12 provided in the collar at a level below said peripheral channel 5.

This reinforcement 11 is obtained from a thin cylindrical ring which is submitted to a similar deformation action as already explained with relation to the neck 3, in such a way that after having suffered this deformation, said reinforcement ring 11 is inseparable from the collar.

Indispensibly the outer diameter D of said reinforcement ring 11 should be comprised between the inner diameter D1 of the neck 3 before deformation and the smallest inner diameter D2 of said neck after deformation. In this way, as shown in FIGURE 7, in spite of the presence of the reinforcing ring 11, the collar 4 can normally be inserted into the orifice 2 of the vessel 1, and the succeeding steps, as explained before, can follow exactly in the same way as if there were no reinforcement. Nevertheless after deformation of the neck 3, as clearly apparent from FIGURE 9, it is practically impossible to remove the collar 4 from the vessel without leaving perceptible, or at least apparent traces.

The example of FIGURES 10 to 13 visualizes the application of the method to another shape of collar, in which a reinforcement ring 13 engages an inner circumferential groove 14. In this case it will be necessary to choose for the outer diameter D3 of said reinforcement ring 13 a value comprised between those of the inner diameter D1–D2 of the neck 3, before and after deformation respectively.

It is to be noted that the use of a safety membrane 7 is optional; that in FIGURE 4 there has been shown an insert 15 having inner threading, said insert being screwed on the collar; that the stop flange or the like provided on the collar can be varied in many ways; that the deformation of the neck, which is the ultimate step of the method can be effectuated with the aid of any appropriate tool, this deformation being applied preferably continuously and uniformly around the entire circumference of the neck, although it may also be applied locally. It is also to be observed that the presence of the peripheral deformation of the neck facilitates encapsulation of the collar, as illustrated in dotted lines 16 in FIGURE 4.

It is to be understood, that in keeping with the elasticity of the plastic material used it will be possible to apply to the collar one or more additional reinforcements, generally reinforcement rings, disposed on the outside of the collar with a view to increasing its rigidity, thus preventing said collar from sliding through the orifice in spite of the deformation of the neck. As a matter of fact, it is necessary to prevent the collar from shifting to the inside, e.g. in consequence of a depression in the vessel, as well as to the outside, e.g. due to excess pressure or an attempt of pulling out the collar.

What I claim is:

1. A collar for insertion into an orifice of a vessel, said collar consisting of an elastic material and having an upper peripheral flange, a pair of grooves located one below the other and below said flange, a reinforcing ring carried by the lowermost groove and a safety membrane consisting of the same material as the collar and integral therewith, closing the top of said collar and connected to the top edge thereof.

2. A collar assembly for insertion into an orifice of a vessel, said collar assembly consisting of a body member made of an elastic plastic material and having an upper peripheral flange, a pair of grooves located below said flange, one of said grooves located upon the outer surface of the collar and the other of said grooves located upon the inner surface of the collar, a reinforcing ring having projecting parametric portions electively disposable within said groove upon the outer surface of the collar, and a safety membrane closing the top of said collar.

References Cited

UNITED STATES PATENTS

| | | | |
|---|---|---|---|
| 2,369,895 | 2/1945 | Hanrahan | 285—203 |
| 2,651,528 | 9/1953 | Robinson | 285—203 |
| 1,689,510 | 10/1928 | Wackman | 285—202 |
| 2,167,654 | 8/1939 | Hothersall | 285—203 |
| 2,687,831 | 8/1954 | Miller | 285—203 |
| 2,772,017 | 11/1956 | Rieke | 285—203 |
| 2,916,311 | 12/1959 | Keplinger | 285—202 |
| 3,080,182 | 3/1963 | Waldo | 285—203 |
| 3,342,366 | 9/1967 | DeFauw | 285—202 |
| 3,358,357 | 12/1967 | DeFauw | 285—202 |

FOREIGN PATENTS 682,480    11/1952    Great Britain.

DAVID J. WILLIAMOWSKY, Primary Examiner

W. L. SHEDD, Assistant Examiner

U.S. Cl. X.R.

150—8